United States Patent [19]

Ueda

[11] Patent Number: 4,549,621
[45] Date of Patent: Oct. 29, 1985

[54] APPARATUS FOR SUPPORTING A TIMING HOPPER IN AN AUTOMATIC WEIGHING SYSTEM

[75] Inventor: Kenji Ueda, Kyoto, Japan

[73] Assignee: Kabushiki Kaisha Ishida Koki Seisakusho, Kyoto, Japan

[21] Appl. No.: 609,442

[22] Filed: May 11, 1984

[30] Foreign Application Priority Data

May 13, 1983 [JP] Japan .............................. 58-72009[U]

[51] Int. Cl.⁴ ..................... G01G 13/16; G01G 13/18; G01G 23/00
[52] U.S. Cl. ..................................... 177/105; 177/59; 177/128; 177/162
[58] Field of Search .................... 177/25, 59, 105–113, 177/DIG. 12, 128, 162

[56] References Cited

U.S. PATENT DOCUMENTS

| 871,630 | 11/1907 | Richardson | 177/111 X |
| 2,177,997 | 10/1939 | Ripley | 177/113 |
| 2,793,024 | 5/1957 | Rose et al. | 177/162 X |
| 4,421,185 | 12/1983 | Koto et al. | 177/25 |

Primary Examiner—E. A. Goldberg
Assistant Examiner—Patrick W. Foster
Attorney, Agent, or Firm—Staas & Halsey

[57] ABSTRACT

A timing hopper supporting apparatus in an automatic weighing system includes a pair of frame members constituting a support frame provided on a base, a pair of support pieces attached to respective ones of the frame members so as to form a predetermined clearance with the lower surface thereof, and a pair of supported pieces attached to outer sides of the timing hopper. The supported pieces include insertion tabs which, when inserted into the clearances, enable the timing hopper to be supported in detachable fashion.

9 Claims, 6 Drawing Figures

4,549,621

APPARATUS FOR SUPPORTING A TIMING HOPPER IN AN AUTOMATIC WEIGHING SYSTEM

BACKGROUND OF THE INVENTION

This invention relates to an apparatus for supporting a timing hopper in an automatic weighing system of the combinatorial weighing type.

A combinatorial weighing-type automatic weighing system known in the art operates by introducing articles into a plurality of weighing machines arranged in a circle, computing combinations of weight values obtained from the weighing machines, selecting the combination giving a total combined weight value equal or closest to a predetermined target value, which combination is referred to as the "optimum" combination, discharging the weighed articles solely from the weighing machines corresponding to the selected combination, and collecting the articles discharged. In the weighing system of the aforesaid type, a collecting chute collects the articles discharged from the weighing machines, and a timing hopper is provided below the discharge port of the collecting chute to retain the articles temporarily before supplying them at a predetermined timing to a packaging apparatus or the like used in combination with the weighing system.

Though the timing hopper is detachably mounted on the main body of the weighing system so as to facilitate, e.g., cleaning, sufficient space is not available for easily detaching the timing hopper owing to the presence of a nearby drive unit for actuating a gate provided on the hopper. Furthermore, in some arrangements the collecting chute is provided with two collection paths or routes, each of which is equipped with a separate timing hopper and a separate drive unit for actuating the gate of the hopper. Such an arrangement limits the available space even more, so that detaching the timing hoppers becomes a troublesome operation.

SUMMARY OF THE INVENTION

An object of the present invention is to provide a supporting apparatus that makes it possible to readily attach and detach, in a limited space, a timing hopper disposed below the collecting chute of an automatic weighing system.

Another object of the present invention is to provide a timing hopper supporting apparatus which enables a timing hopper to be readily attached without using mounting screws, and which makes it possible to attach and detach the timing hopper in a time-saving manner.

According to the present invention, the foregoing objects are attained by providing an apparatus for supporting a timing hopper disposed below an automatic weighing system. The apparatus includes first and second frame members constituting a support frame attached to a base of the weighing system, first and second support pieces secured to the first and second frame members, respectively, in such a manner as to form predetermined clearances with a lower surface of the first and second frame members, the first and second support pieces each having two support portions, first and second supported pieces attached to the timing hopper on respective outer sides thereof, the first and second supported pieces having two insertion tabs corresponding to the two support portions on each of the first and second support pieces, and limiting means for limiting movement of the timing hopper under a condition in which the insertion tabs of the first and second supported pieces are inserted into the predetermined clearances.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Reference will now be had to the drawings to describe embodiments of the present invention.

Figure 1:
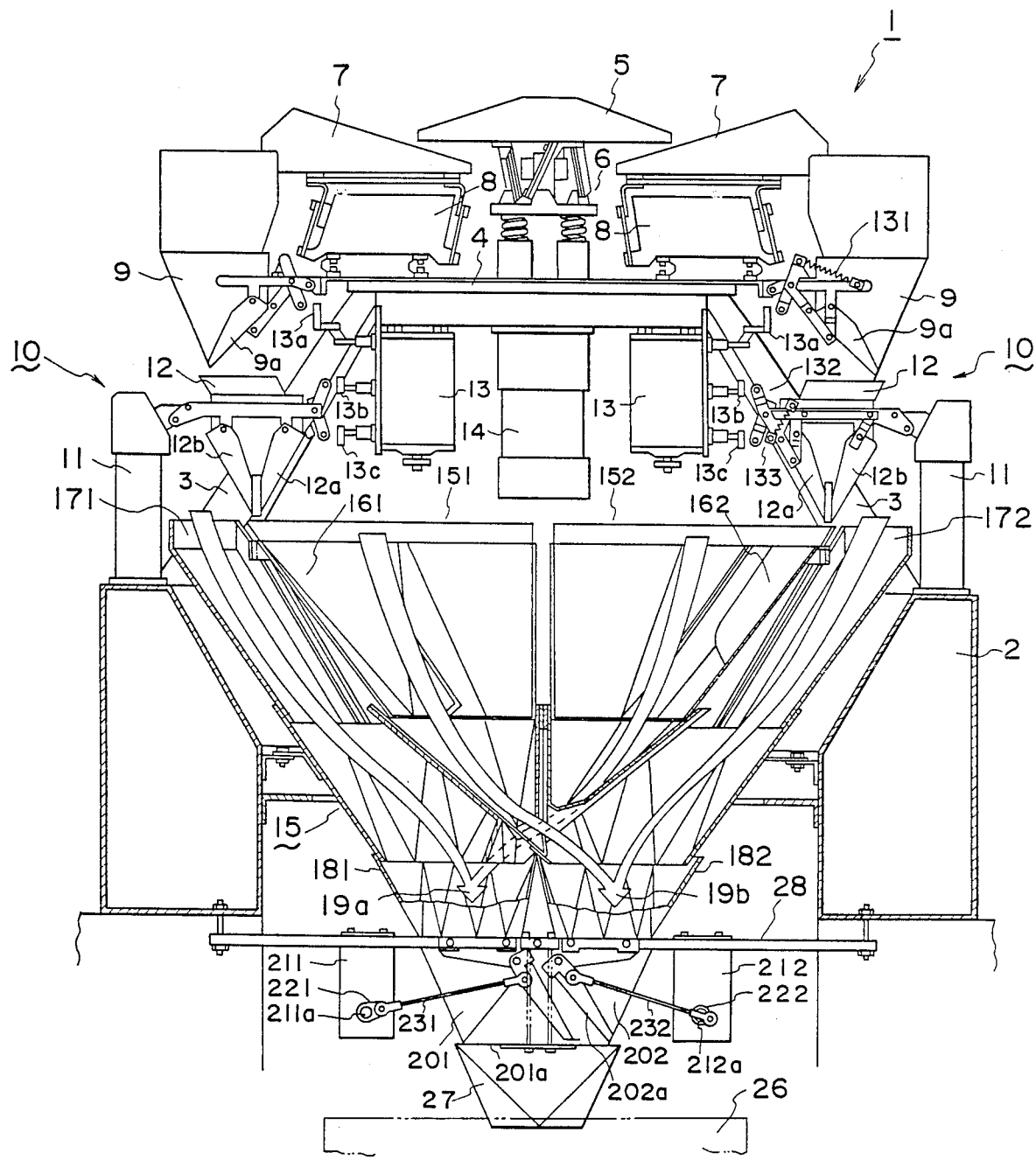
FIG. 1 is a front view, partially broken away, showing a portion of an automatic weighing system equipped with a timing hopper supporting apparatus according to the present invention.

FIG. 1 illustrates a portion of an automatic weighing system, the main body of which is shown at numeral 1, having a timing hopper supporting apparatus according to the present invention. The automatic weighing system has a base 2 above the central portion of which is supported a platform 4 by means of a plurality of support legs 3. Disposed above the central portion of the platform 4 is a circular dispersing table 5 supported on the platform 4 by a vibrating device 6. Articles which drop onto the dispersing table 6 from a chute of a supply conveyor (not shown) migrate toward the outer edge of the table owing to vibration applied thereto by the vibrating device 6. The articles drop successively from the outer edge of the dispersing table 5 into a plurality of underlying, radially arranged troughs 7 surrounding the table. Each trough 7 is supported on the platform 4 by a corresponding vibrating device 8 the vibratory action of which causes the articles received from the dispersing table 5 to migrate from one end of the trough to the other or outer end, from which end the articles fall. Supported on the platform 4 are a plurality of pool hoppers 9 each of which corresponds to one of the troughs 7. Each pool hopper 9 is disposed below the outer end of the corresponding trough 7 to receive the articles which fall from trough, and is provided with a gate 9a. A plurality of weighing machines 10 are disposed below corresponding ones of the pool hoppers 9. Each weighing machine 10 comprises a weight sensor 11 mounted on the base 2, and a weighing hopper 12 attached to the weight sensor 11 so as to underlie the corresponding pool hopper 9. Each weighing hopper 12 is provided with a gate 12a which is opened toward the center of the weighing system, and a gate 12b which is opened outward or away from the center of the weighing system. A plurality of hopper gate actuating units 13 depend from the lower side of the platform 4. Each hopper gate actuating unit 13 corresponds to one hopper set consisting of one of the pool hoppers 9 and the corresponding underlying weighing hoppers 12. Each hopper gate actuating unit 13 is equipped with three push-rods 13a, 13b, 13c. When thrust forward, the push-rods 13a, 13b, 13c operate through respective link mechanisms 131, 132, 133 to open the gate 9a of pool hopper 9, and the gates 12a, 12b of the weighing hopper 12, respectively. The gate actuating units 13 are operated by a single motor 14 depending from the bottom side of the platform 4 at the central portion thereof.

A collecting chute 15 is disposed below the weighing hoppers 12 and supported on the base 1. The collecting chute 15 has a funnel-shaped configuration having an upper end which opens toward the weighing hoppers 12, as well as an open lower end. As shown in FIG. 1, the collecting chute 15 is divided into left and right parts 151, 152. The left and right parts 151, 152 include, respectively, inner receiving portions 161, 162 for receiving weighed articles discharged from the weighing hoppers 12 by opening the inner gates 12a thereof, and outer receiving portions 171, 172 for receiving weighed articles discharged from the weighing hoppers 12 by opening the outer gates 12b thereof. Attached to the lower end portion of the collecting chute 15 are discharge chutes 181, 182 corresponding to the left and right parts 151, 152 of the collecting chute. The divided collecting chute 15 and the two discharge chutes 181, 182 define first and second collecting routes 19a, 19b, respectively. The first collecting route 19a, which leads to the left-hand discharge chute 181, is formed of combined paths passing through the left-hand outer receiving portion 171 of the collecting chute 15 and the right-hand inner receiving portion 162 of the collecting chute 15. The second collecting route 19b, which leads to the right-hand discharge chute 182, is formed of combined paths passing through the right-hand outer receiving portion 172 of the collecting chute 15 and the left-hand inner receiving portion 161 of the collecting chute 15.

Numerals 201, 202 denotes first and second timing hoppers disposed below the respective discharge chutes 181, 182. The mutually opposing sides of the timing hoppers 201, 202 are equipped with gates 201a, 202a, respectively. The timing hoppers 201, 202 are supported, by a supporting apparatus described below, on a frame 28 secured to the base 2.

Gate actuating units 211, 212, disposed on the outer sides of the first and second timing hoppers 201, 202, respectively, depend from the support frame 28. The gate actuating units 211, 212 have respective rotary shafts 211a, 212a connected to the gates 201a, 202a of the first and second timing hoppers 201, 202 via crank arms 221, 222 and drive rods 231, 232, respectively. The gates 201a, 202a are opened and closed by the drive rods 231, 232 as the rotary shafts 211a, 212a rotate.

Numeral 27 denotes a supply chute disposed below the first and second timing hoppers 201, 202 for supplying a packaging apparatus 26 with weighed articles discharged by the first and second timing hoppers 201, 202.

Reference will now be had to FIGS. 2 through 5 to describe a supporting apparatus for supporting the first and second timing hoppers 201, 202 on the support frame 28. It should be noted that the supporting apparatus for both timing hoppers are identical in construction, so that the description will deal solely with the supporting apparatus for the second timing hopper.

The support frame 28 comprises a pair of parallel frame members 29 having a rectangular cross section. Fixedly secured to each frame member 29 is a support piece 30 having an L-shaped cross section. The base of each support piece 30 is formed to include front and rear support portions 301, 302 at the front and rear ends thereof, respectively, with the support piece having a longitudinally extending cut-out 303 at the intermediate portion thereof. Each support piece 30 is secured by screws 31, 31 to the outer side surface of the corresponding frame member 29 in such a manner that predetermined clearances S1, S2 are formed between a lower surface 29a of the frame member 29 and each of the front and rear support portions 301, 302, respectively. Further, the back ends of the front and rear support portions 301, 302 are bent to form guide portions 301a, 302a inclining downwardly therefrom.

The main body of the timing hopper 202 has sides 202a, 202a to the outer face of each of which there is attached a supported piece 32. Each supported piece 32 is formed to include a longitudinally extending cut-out 323 at the intermediate portion thereof, with the front and rear portions of each supported piece 32 constituting insertion tabs 321, 322. The front insertion tabs 321, 321 of the supported pieces 32, 32 are inserted into the clearances S1, S1 formed between the lower surfaces of frame members 29, 29 and the front support portions 301, 301 of the support pieces 30, 30, and the rear insertion tabs 322, 322 of the supported pieces 32, 32 are inserted into the clearances S2, S2 formed between the lower surfaces of frame members 29, 29 and the rear support portions 302, 302 of the support pieces 30, 30. The timing hopper 202 may thus be supported on the support frame 28, which comprises the frame members 29, 29, via the supported pieces 32 and support pieces 30.

Figure 2:
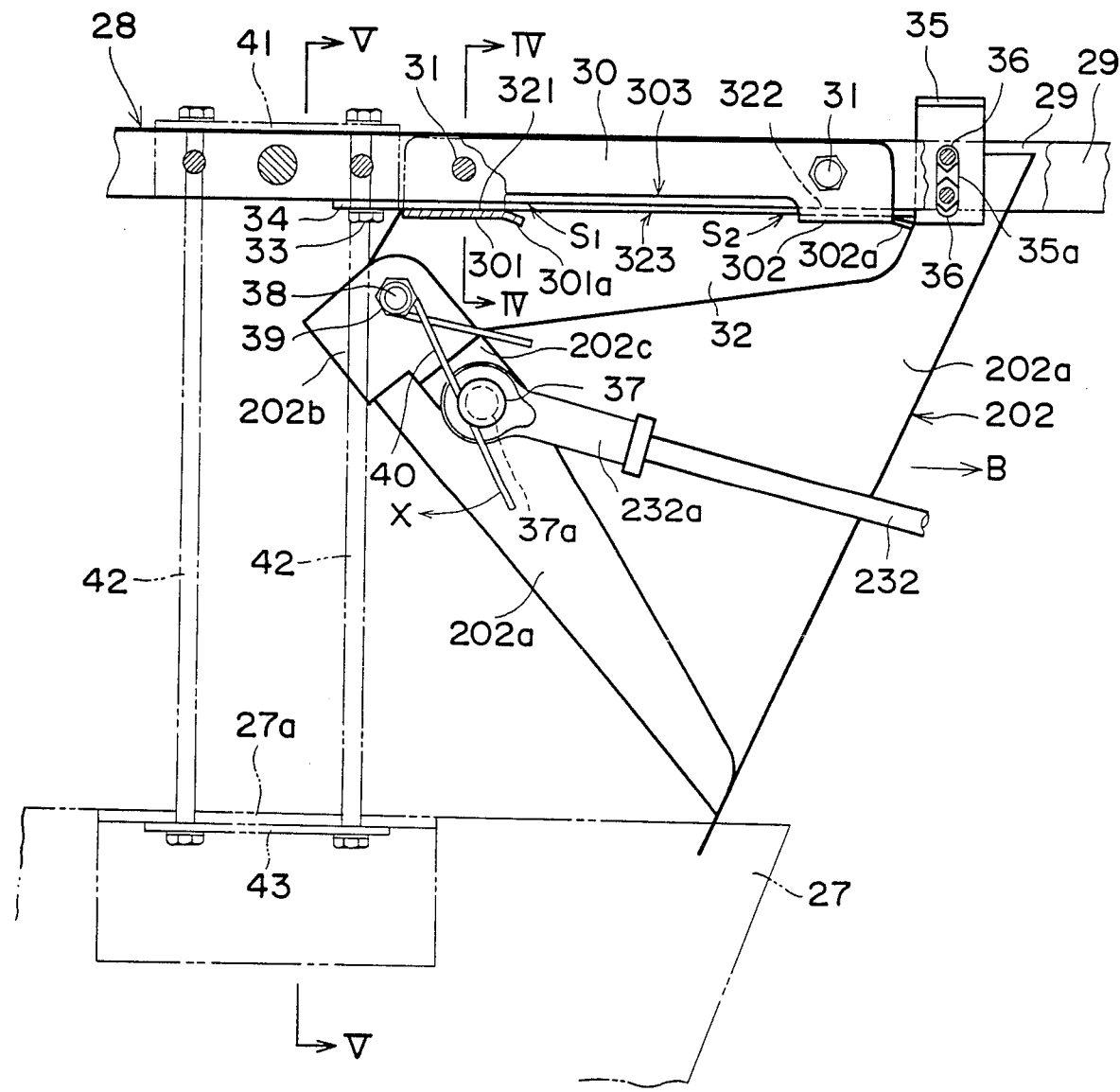
FIG. 2 is an enlarged front elevational view, partially broken away, showing the principal portion of a timing hopper supporting apparatus embodying the present invention.

A stopper 34 is secured by a screw 33 to the lower surface 29a of each frame member 29 forwardly of the support piece 30. The stopper 34 checks forward movement of the timing hopper 202 by being contacted by the forward end of the front insertion tab 321 of the supported piece 32 when the timing hopper 202 is mounted on the support frame 28 in the manner described above. One of the frame members 29 constituting the support frame 28 has a locking member 35 attached to its inner side. The locking member 35 engages the aft end of the rear insertion tab 322 of one of the supported pieces 32 when the latter is in abutting contact with the corresponding stopper 34, thereby preventing rearward movement of the supported piece 32 and, hence, of the timing hopper 202. As shown in FIG. 2, the locking member 35 is provided with a vertically extending oblong hole 35a, and is retained by two screws 36 passing through the hole 35a so as to be slidable upwardly from the position illustrated. In the position shown in FIG. 2, the locking member 35 engages the aft end of the supported member 32 to limit the rearward movement of the timing hopper 202. However, sliding the locking member 35 upwardly disengages it from the supported member 32 to permit rearward movement of the timing hopper 202.

With the timing hopper 202 mounted on the support frame 28 as described above, an end 232a of the drive rod 232 on the gate side thereof is fitted over a pin 37 projecting from a reinforcing frame 202b of the gate 202a, thereby to connect the drive rod 232 and the gate 202a together. An end portion of the pin 37 is formed to include an annular groove 37a. A torsion spring 40 attached by a nut 39 to a pivot shaft 38 of the gate 202a has one end thereof engaging with a step 202c formed on the reinforcing frame 202b, and has the other end thereof held in resilient engagement with the groove 37a. This prevents the rod end 232a from slipping off the pin 37.

Fixedly secured to the central portion of each support frame 29 is an outwardly extending bracket 41. Two rods 42 depend from each of the brackets 41 and have a chute supported plate 43 attached to the lower ends. The chute support plates 43, 43 receive and support respective brackets 27a, 27a secured to the supply chute 27, whereby the supply chute is supported in suspended fashion.

The automatic weighing system having the timing hopper supporting apparatus of the present invention has the construction described above. Weighed articles supplied from the dispersing table 5 to the weighing hoppers 12 via the troughs 7 and pool hoppers 9 are weighed by the corresponding weight sensors 11. Based on the weight values obtained, combinatorial computations are performed to select an optimum combination of these weight values. When such a combination has been selected, the inner gates 12a or outer gates 12b of the weighing hoppers 12 corresponding to the optimum combination are opened to release the articles into the collecting chute 15 from these hoppers. These articles are introduced into the first timing hopper 201 (or the second timing hoppers 202) via the first collecting route 19a (or the second collecting route 19b). After the articles are temporarily retained by the timing hopper 201 (or 202), the gate actuating unit 211 (or 212) opens the gate 201a (or 202b) at a predetermined timing to supply the articles to the packaging apparatus or the like through the supply chute 27. While the foregoing is in progress, the weighing system proper performs the next weighing cycle to introduce the next batch weighed articles into the second timing hopper 202 (or the first timing hopper 201) via the second collecting route 19b (or the first collecting route 19a). Thus, weighed articles are introduced into the first and second timing hoppers 201, 202 alternatingly so that both timing hoppers supply the packaging apparatus 29 with articles in alternating fashion.

At the end of a weighing operation, the first and second timing hoppers 201, 202 are detached from the support frame 28 of the base 2 for, e.g., cleaning. The detaching procedure will now be described in connection with the second timing hopper 202.

First, the operator removes the end of the torsion spring 40 from the annular groove 37a of pin 37 by pressing this end in the direction X (FIG. 2) against the elastic force of the spring. The end 232a of a drive rod 232 is now slipped off the pin 37 to break the connection between the drive rod 232 and the gate 202a. At this time the pressed end of the spring 40 snaps back in the opposite direction owing to the restoration force of the spring, the other end of which is engaging the step 202c of the reinforcing frame 220b.

Next, the operator uses his finger to slide the locking member 35 upwardly, whereby the locking member 35 is removed from engagement with the aft end of the corresponding supported piece 32. This makes it possible to slide the timing hoper 202 rearwardly, i.e., in the direction B of FIG. 2, which activity the operator now performs while holding the locking member 35 in the raised position. When this is done, the front insertion tabs 321, 321 and the rear insertion tabs 322, 322 of the two supported pieces 32, 32 slip out from the clearances S1, S1 and S2, S2 formed between the lower surfaces 29a, 29a of the frame members 29, 29 and the front and rear support portions 301, 301 and 302, 302 of the support pieces 30, 30. At the instant the insertion tabs separate from the corresponding support portions, namely when the insertion tabs 321, 321 are situated at the cut-outs 303, 303 of the support pieces 30, 30, as shown in phantom in FIG. 3, the timing hopper 202 is completely disconnected from the support frame 28 and can be lowered away therefrom.

To attach the timing hopper 202 to the support frame 28, the operator slides the locking member 35 upwardly and positions the insertion tabs 321, 321 and 322, 322 of the supported pieces 32, 32, which are attached to the hopper, rearwardly of the support portions 301, 301 and 302, 302 of the support pieces 30, 30, from which position the timing hopper 202 is slid forwardly. When this is done, the supported pieces 32, 32, namely the insertion tabs 321, 321, are inserted into the clearances S1, S1 and S2, S2, so that the forward ends of the front insertion tabs 321, 321 are brought into abutting contact with the stoppers 34, 34, at which time the locking member 35 is lowered to engage with aft end of one of the mounted pieces 32. The timing hopper 202 is thus mounted on the support frame 28. It should be noted that the supported pieces 32 can be inserted into the clearances S1 and S2 very easily owing to the downwardly curving guide portions 301a, 302a formed at the aft ends of the support portions 301, 302 of the support pieces 30.

In the illustrated embodiment, the support pieces 30 and supported pieced 32 are each provided with the centrally located cut-outs 303, 323, respectively, with the arrangement being such that the front and rear support portions 301, 302 engage with the front and rear insertion tabs 321, 322. Therefore, despite the fact that the timing hopper 202 is stably supported over the full length (L in FIG. 3) of the support pieces, the hopper need only be slid a distance l (FIG. 3) when it is attached and detached. This makes it a simple matter to attach and detach the timing hoppers 202, 203 even when there is little space, as is the case in FIG. 1 where the gate actuating units 211, 212 are disposed in close proximity to the outer sides of the timing hoppers 202, 203, respectively.

Figure 3:
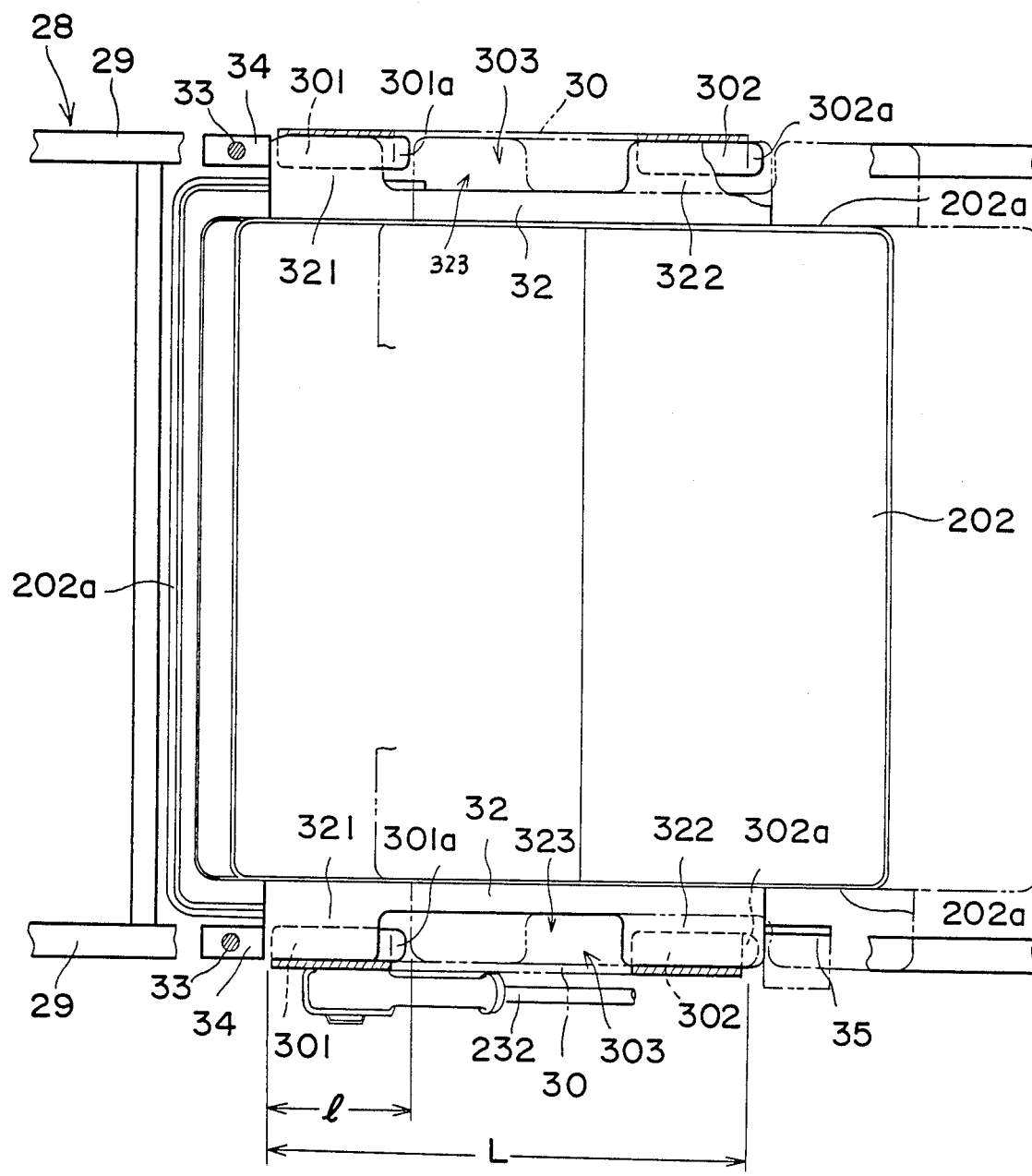
FIG. 3 is a plan view of the apparatus shown in FIG. 2.
Figure 4:
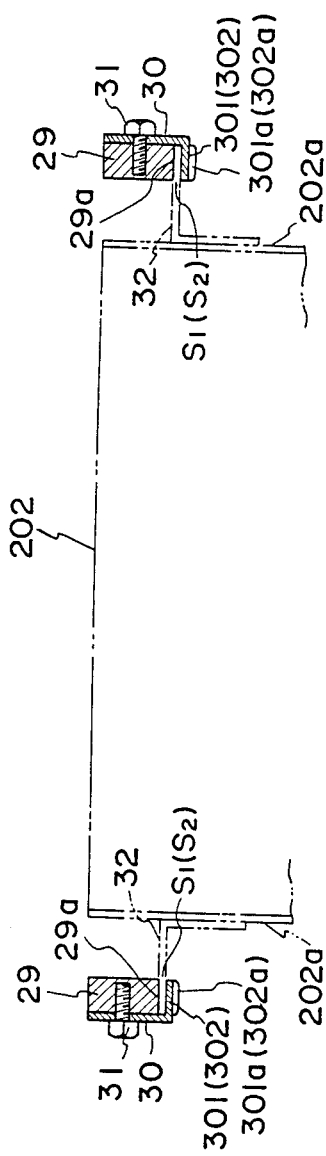
FIG. 4 is a longitudinal sectional view, partially cut away, taken along line IV—IV of FIG. 2.
Figure 5:
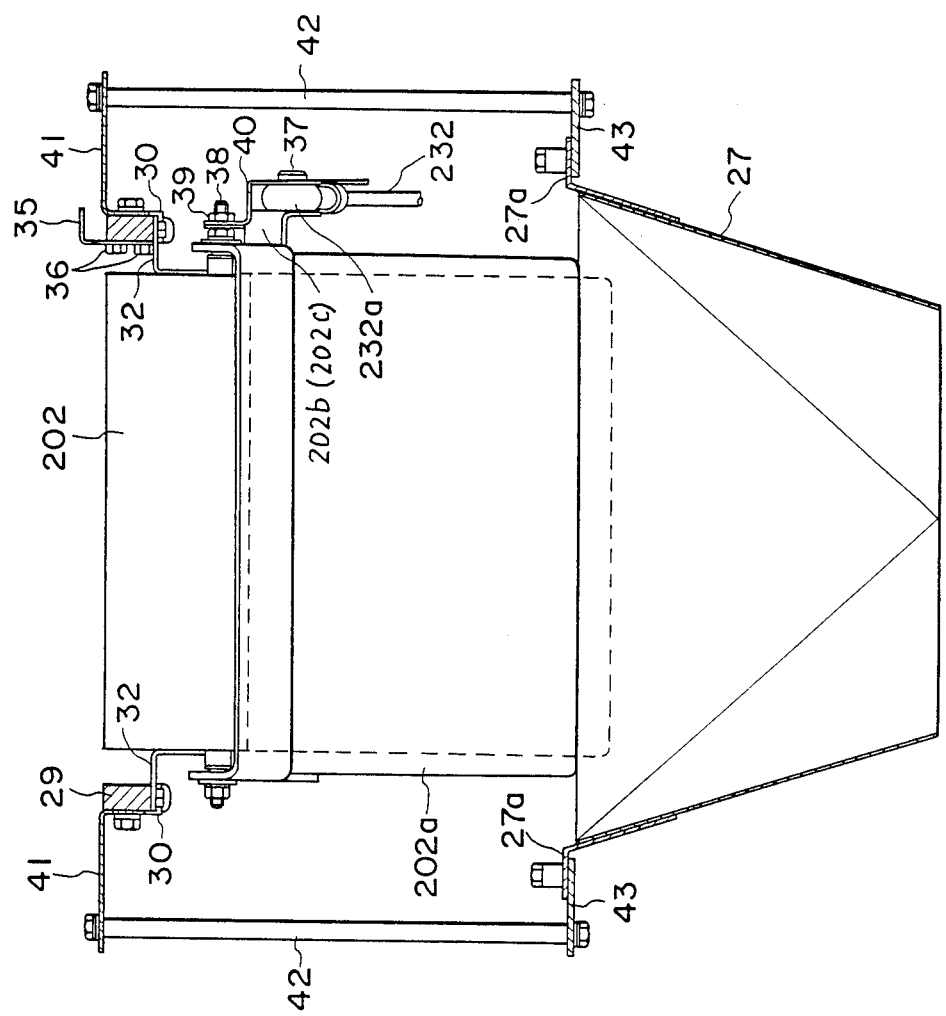
FIG. 5 is a sectional view taken along line V—V of FIG. 2.
Figure 6:
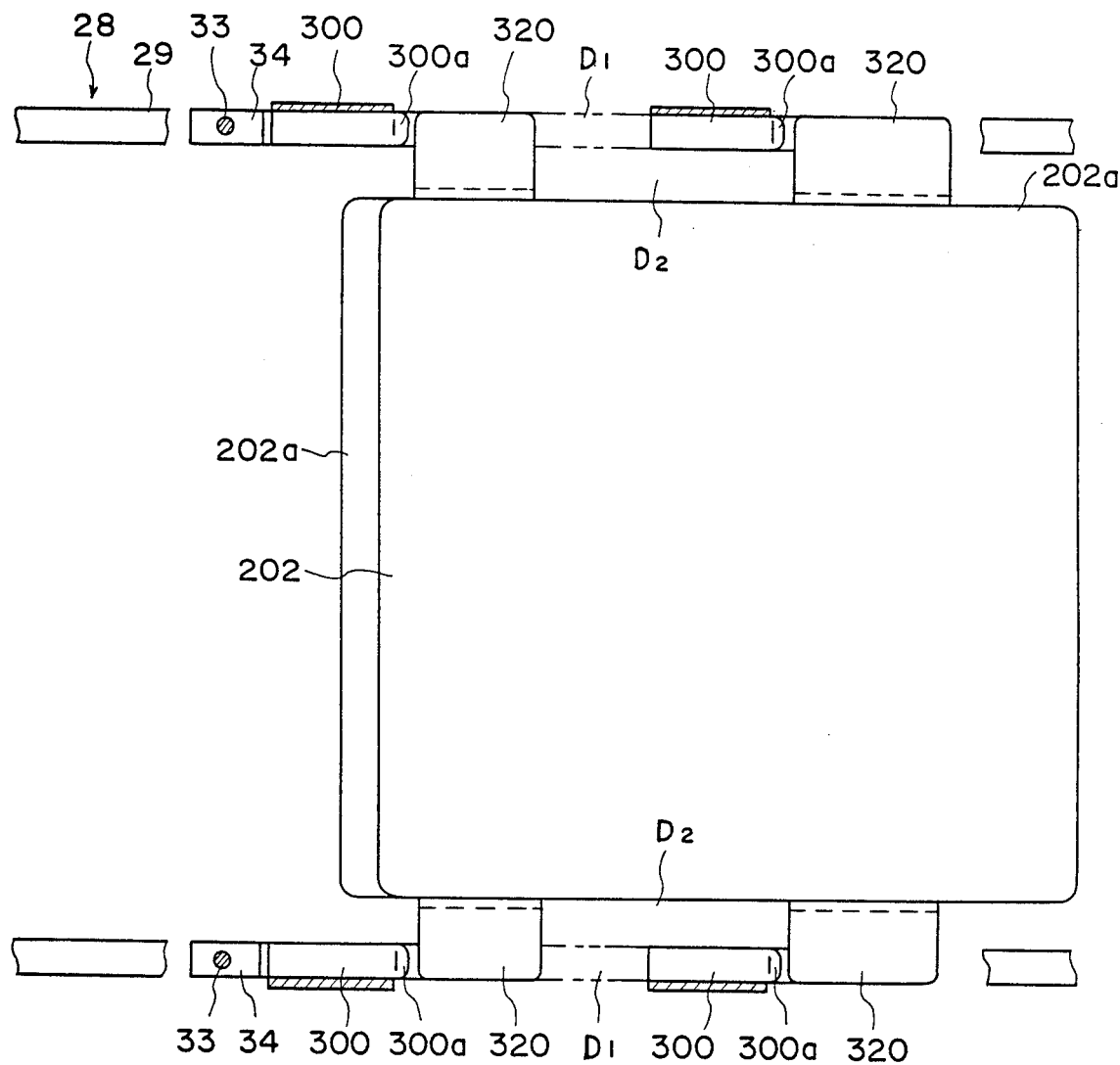
FIG. 6 is a plan view illustrating another embodiment of the present invention.

FIG. 6 illustrates a second embodiment of a timing hopper supporting apparatus according to the present invention. Portions corresponding to those shown in FIG. 3 are designated by like reference characters and need not be described again. In the first embodiment, each support piece 30, as well as each each supported piece 32, comprises a single element. In the present embodiment, however, each support piece comprises two support members 300, 300 secured to each one of the frame members 29, 29 constituting the support frame 28. The support members 300, 300 are spaced apart by a distance D1, which corresponds to the length of the cut-out 303 formed in each of the support pieces 30 of the first embodiment. Similarly, each supported piece in the present embodiment comprises two supported members 320, 320 attached to the outer sides of the timing hopper 202. The supported pieces 320, 320 on each outer side of the timing hopper are spaced apart by a distance D2, which corresponds to the length of the cut-out 323 formed in each of the supported pieces 32 of the first embodiment.

In another possible arrangement, each support piece may comprise one member and each supported piece two members, or vice versa.

As many apparently widely different embodiments of the present invention can be made without departing from the spirit and scope thereof, it is to be understood that the invention is not limited to the specific embodiments thereof except as defined in the appended claims.

What we claim is:

1. An apparatus for supporting a hopper of an automatic weighing system, comprising:
   a support frame having first and second frame members;
   first and second support pieces secured to said first and second frame members, respectively, in such a manner as to form predetermined clearances with a lower surface of said first and second frame members, said first and second support pieces each having two support portions;
   first and second supported pieces attached to the hopper on respective outer sides thereof, said first and second supported pieces each having two insertion tabs corresponding to the two support portions on each of said first and second support pieces; and
   limiting means for limiting movement of the hopper when the insertion tabs of the first and second supported pieces are inserted into said predetermined clearances.

2. The apparatus according to claim 1, wherein each of said first and second support pieces comprises a single member having the support portions formed at front and rear parts thereof so as to define a longitudinally extending cut-out therebetween.

3. The apparatus according to claim 1, wherein each of said first and second support pieces comprises two members spaced apart from each other.

4. The apparatus according to claim 1, wherein each of said first and second support pieces has a downwardly curving guide portion formed at a rear end of each support portion.

5. The apparatus according to claim 1, wherein each of said first and second supported pieces comprises a single member having the insertion tabs formed at front and rear parts thereof so as to define a longitudinally extending cut-out therebetween.

6. The apparatus according to claim 1, wherein each of said first and second supported pieces comprises two members spaced apart from each other.

7. The apparatus according to claim 1, wherein said limiting means comprises:
   a stopper secured to at least one of said first and second frame members for being contacted at a predetermined position by a front end of one of said first and second supported pieces when the insertion tabs of said first and second supported pieces are inserted into said predetermined clearances, and
   a releasable locking member secured to at least one of said first and second frame members for engaging a rear end of at least one of said first and second supported pieces under a condition in which said stopper is being contacted by the front end of one of said first and second supported pieces.

8. The apparatus according to claim 2, wherein in each of said first and second support pieces has a downwardly curving guide portion formed at a rear end of each support portion.

9. The apparatus according to claim 3, wherein in each of the first and second support pieces has a downwardly curving side portion formed at a rear end of each support portion.

* * * * *